US011993190B2

(12) United States Patent
Baur et al.

(10) Patent No.: US 11,993,190 B2
(45) Date of Patent: May 28, 2024

(54) STORAGE DEVICE FOR A VEHICLE

(71) Applicant: Bayerische Motoren Werke Aktiengesellschaft, Munich (DE)

(72) Inventors: Manuel Baur, Augsburg (DE); Andreas Beck, Waldbrunn (DE); Markus Riess, Eschenburg (DE); Nicolas Rojek, Burbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 131 days.

(21) Appl. No.: 17/044,416

(22) PCT Filed: May 9, 2019

(86) PCT No.: PCT/EP2019/061952
§ 371 (c)(1),
(2) Date: Oct. 1, 2020

(87) PCT Pub. No.: WO2019/219506
PCT Pub. Date: Nov. 21, 2019

(65) Prior Publication Data
US 2021/0031664 A1 Feb. 4, 2021

(30) Foreign Application Priority Data
May 15, 2018 (DE) ...................... 10 2018 207 510.7

(51) Int. Cl.
*B60N 3/10* (2006.01)
(52) U.S. Cl.
CPC ............. *B60N 3/102* (2013.01); *B60N 3/106* (2013.01)
(58) Field of Classification Search
CPC .......... B60N 2/10; B60N 2/102; B60N 2/105; B60N 2/106; B60N 3/10; B60N 3/102; B60N 3/105; B60N 3/106; Y10S 224/926
(Continued)

(56) References Cited

U.S. PATENT DOCUMENTS 5,170,980 A * 12/1992 Burrows .................. B60R 7/04
224/483
5,692,658 A 12/1997 Fischer et al.
(Continued)

FOREIGN PATENT DOCUMENTS

CN 101480932 A 7/2009
CN 104071081 A 10/2014
(Continued)

OTHER PUBLICATIONS

International Search Report (PCT/ISA/210) issued in PCT Application No. PCT/EP2019/061952 dated Jul. 25, 2019 with English translation (four (4) pages).
(Continued)

*Primary Examiner* — Jonathan Liu
*Assistant Examiner* — Guang H Guan
(74) *Attorney, Agent, or Firm* — Crowell & Moring LLP

(57) ABSTRACT

A storage device for a vehicle has a housing, a drawer, which in normal use can be moved relative to the housing in a vehicle longitudinal direction between a closed state and an open state, a movable wall, and a movement mechanism, which is designed to change the position of the movable wall from the closed state of the drawer, in which closed state the movable wall is in a retracted position, at least into a first extended position in the open state of the drawer. In the retracted position, the movable wall is arranged in a cavity of a wall of the drawer. In the first extended position, the movable wall is at least partially arranged in an interior of the drawer.

19 Claims, 4 Drawing Sheets

(58) Field of Classification Search
USPC .................. 248/311.2; 296/37.8; 224/281
See application file for complete search history.

(56) References Cited

U.S. PATENT DOCUMENTS

| | | | | |
|---|---|---|---|---|
| 5,876,007 | A * | 3/1999 | Lancaster | B60N 3/102 297/188.17 |
| 5,921,519 | A | 7/1999 | Dexter et al. | |
| 6,059,244 | A * | 5/2000 | Bilandzic | B60N 3/106 248/311.2 |
| 6,431,391 | B1 * | 8/2002 | Kaupp | B60N 3/102 220/737 |
| 6,464,187 | B1 * | 10/2002 | Bieck | B60N 3/102 248/311.2 |
| 7,108,239 | B2 * | 9/2006 | Takahashi | B60N 2/0224 248/311.2 |
| 7,789,265 | B2 * | 9/2010 | Kearney | B60N 3/106 220/737 |
| 8,322,671 | B2 * | 12/2012 | Myers | B60N 3/108 248/311.2 |
| 8,469,246 | B2 * | 6/2013 | Lee | B60N 3/102 224/282 |
| 9,211,828 | B2 * | 12/2015 | Masuda | B60N 3/102 |
| 11,046,228 | B2 * | 6/2021 | Shin | B60N 3/106 |
| 2003/0075660 | A1 | 4/2003 | Dieringer | |
| 2005/0001127 | A1 | 1/2005 | Schaal | |
| 2009/0159623 | A1 | 6/2009 | Kreutmayr | |
| 2014/0292016 | A1 | 10/2014 | Masuda | |
| 2014/0339846 | A1 | 11/2014 | Masuda et al. | |
| 2016/0101718 | A1 | 4/2016 | Bohlke et al. | |
| 2017/0210255 | A1 * | 7/2017 | Jaradi | A47C 7/624 |
| 2021/0031664 | A1 * | 2/2021 | Baur | B60N 3/102 |

FOREIGN PATENT DOCUMENTS

| | | |
|---|---|---|
| CN | 104175935 A | 12/2014 |
| CN | 104590078 A | 5/2015 |
| DE | 44 44 955 A1 | 6/1996 |
| DE | 199 54 670 A1 | 5/2001 |
| DE | 101 09 119 A1 | 9/2002 |
| DE | 20 2004 016 914 U1 | 2/2005 |
| EP | 1 493 619 A2 | 1/2005 |

OTHER PUBLICATIONS

German-language Written Opinion (PCT/ISA/237) issued in PCT Application No. PCT/EP2019/061952 dated Jul. 25, 2019 (six (6) pages).

German-language Search Report issued in German Application No. 10 2018 207 510.7 dated Jan. 16, 2019 with partial English translation (13 pages).

English translation of Chinese-language Office Action issued in Chinese Application No. 201980023366.1 dated Feb. 22, 2022 (seven (7) pages).

* cited by examiner

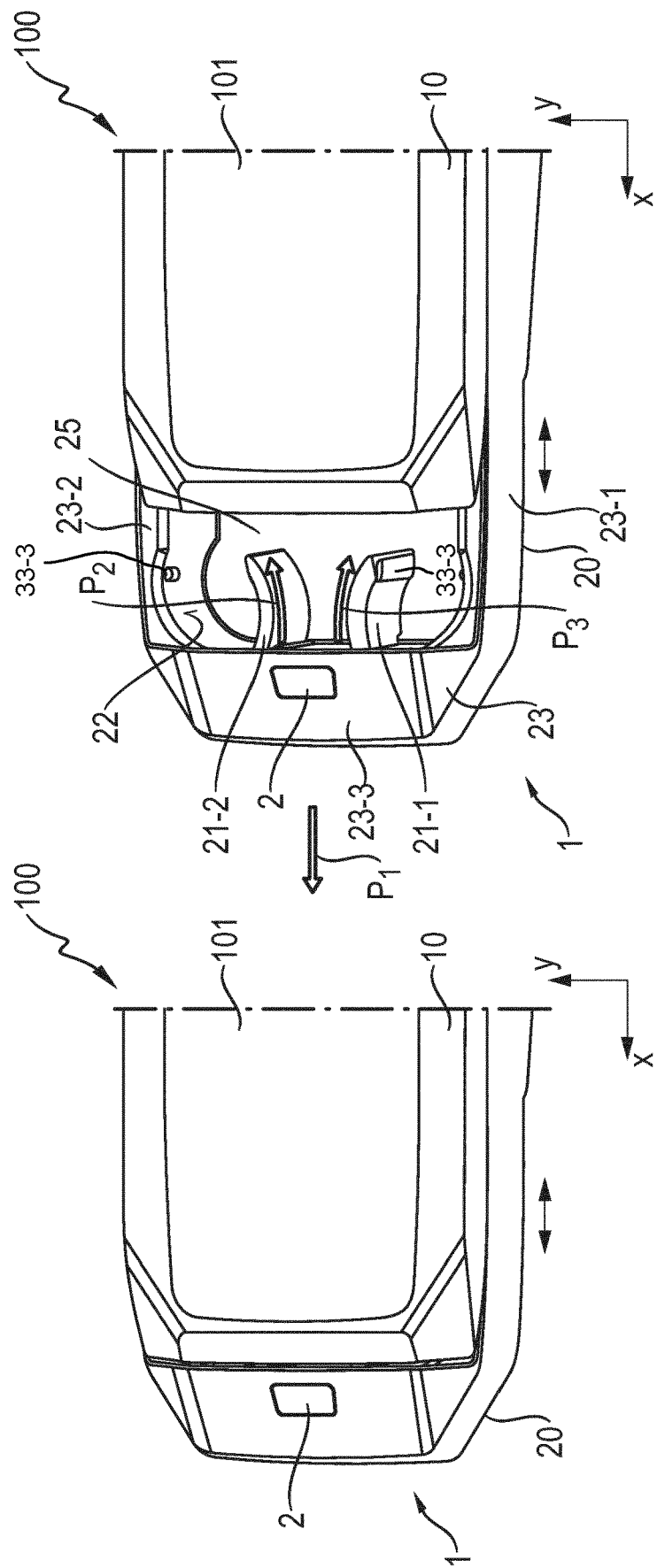

STORAGE DEVICE FOR A VEHICLE

BACKGROUND AND SUMMARY OF THE INVENTION

The present invention relates to a storage device for a vehicle, in particular a storage device which is integrated into a central console of the vehicle, to a central console of a vehicle, and to a vehicle equipped with the storage device.

Vehicles customarily have a plurality of storage devices for storing and accommodating objects. Known central consoles of a motor vehicle also comprise for example, in addition to operator control elements for actuating electronic devices of the vehicle, a shift lever and a handbrake handle, fixed or displaceable storage devices for accommodating a drink cup or for storing other objects.

Since the installation space for these fixed or displaceable storage devices, which can also have a cover for closing a storage compartment of the storage device, is not changed even when they are not required, the available space in the interior of the vehicle is unnecessarily limited.

It is therefore an object of the present invention to provide a storage device for a vehicle by means of which the available space in the interior of the vehicle, in particular in the region in front of the central console of the vehicle, can be increased when the storage device is not required for storing an object.

This object is achieved by a storage device for a vehicle in accordance with the independent claims. Advantageous refinements and developments of the invention can be found in the dependent claims.

A storage device for a vehicle according to one embodiment comprises a housing, a drawer, which during intended use can be moved relative to the housing along a vehicle longitudinal direction between a closed state and an open state, a movable wall, and a movement mechanism which is designed to change a position of the movable wall starting from a closed state of the drawer, in which the movable wall is in a retracted position, at least into a first extended position in the open state of the drawer, wherein, in the retracted position, the movable wall is arranged in a cavity of a wall of the drawer, and, in the extended position, is arranged at least partially in an interior of the drawer.

The movable wall can for example be provided, in the first extended position, in interaction with the wall of the drawer, to maintain a position of an object, such as for instance a drink cup, which is deposited in the interior of the drawer between the movable wall and the wall of the drawer.

By virtue of the fact that the drawer can be closed when the storage device is not required for storing the object, in particular for maintaining the position thereof, the installation space along the vehicle longitudinal direction that is additionally present in the closed state can be used in some other way.

Furthermore, by virtue of the fact that, in the closed state of the drawer, the movable wall is situated in the cavity of the wall of the drawer, no space for accommodating the movable wall in the interior of the drawer is required in the closed state of the drawer. In this way, the installation space which is saved in the closed state can advantageously be used for providing other components within the housing.

The movement mechanism can have a rotary disk and a torsion spring, wherein the rotary disk can be rotated about an axis of rotation and is mounted on the drawer, the movable wall is coupled to the rotary disk or is connected to the rotary disk in a rotationally fixed manner in such a way that the movable wall is moved during a rotation of the rotary disk, and the torsion spring is designed to exert a force on the rotary disk in order to rotate the rotary disk about the axis of rotation in a first direction of rotation, and thus to change the position of the movable wall from the retracted position at least into the first extended position.

The movable wall preferably has a curved shape in cross section perpendicular to the axis of rotation, wherein the movement mechanism is designed to move the movable wall from the retracted position into the extended position along a circular path whose radius corresponds to a radius of curvature of the movable wall.

The storage device preferably also comprises a retraction mechanism which is designed, during a movement of the drawer along a closing direction of the drawer, in an extended position of the movable wall, to rotate the rotary disk about the axis of rotation in a second direction of rotation opposite the first direction of rotation in such a way that the movable wall is in the retracted position in the closed state of the drawer.

The retraction mechanism can have a retraction projection, which is connected to the rotary disk, and a rotary disk retraction contour fastened to the housing, which are designed in such a way that the retraction projection comes into contact with the rotary disk retraction contour during the movement of the drawer along the closing direction and remains in contact therewith during the subsequent further movement of the drawer along the closing direction, and the rotary disk is thus rotated in the second direction of rotation.

The storage device can also comprise a rotary disk locking device which is designed to hold the rotary disk in a position in which the movable wall is in the retracted position.

Here, the storage device preferably also has a rotary disk unlocking device which is designed to unlock the rotary disk locking device in response to an actuation of the rotary disk unlocking device by a user.

According to one embodiment, the storage device also comprises a damping device which is designed to damp a rotary movement of the rotary disk.

A latching element can be provided on the rotary disk, and a latching contour can be provided on the drawer, wherein the latching element and the latching contour are designed in such a way that, in the first extended position of the movable wall, the latching element bears against the latching contour in order to prevent a further movement of the rotary disk in the direction of the first direction of rotation.

Here, the latching element and the latching contour can be designed in such a way that, upon exertion of an external force, whose magnitude is greater than a predetermined value, on the movable wall in the direction of the first direction of rotation, the rotary disk is moved further in the direction of the first direction of rotation, and the latching element slides over the latching contour.

The storage device can also have an end stop which is mounted on the drawer and by means of which a second extended position of the movable wall is defined and which is designed to prevent a further rotary movement of the rotary disk in the first direction of rotation after the latching element has slid over the latching contour.

The storage device preferably also has a clamping device which is designed, in the open state of the drawer during the intended use, to firmly clamp an object, which is provided in a predetermined region of the interior of the drawer, between the wall of the drawer and the movable wall when the movable wall is in the first extended position.

According to one embodiment, the clamping device has at least one elastically preloaded clamping element, wherein the at least one elastically preloaded clamping element is mounted on the wall of the drawer and is designed to press the object in the direction of the movable wall situated in the first extended position, and/or is mounted on the movable wall and designed, in the first extended state, to press the object in the direction of the wall of the drawer.

The movement mechanism can have a fastening axle which is coupled to the rotary disk, wherein the movable wall is mounted on the fastening axle in such a way that the movable wall can be pivoted about the fastening axle.

Here, the fastening axle preferably extends parallel to the axis of rotation.

In this embodiment, the clamping device can comprise a clamping spring which is designed to exert a force on the movable wall in order, at least in the first extended position, to pivot the movable wall about the fastening axle in a pivoting direction in such a way that the object is pressed in the direction of the wall of the drawer.

The storage device can also comprise a pivot-limiting device which is designed to limit a pivoting movement, caused by the clamping spring, of the movable wall in the pivoting direction to a predetermined pivoting angle, wherein, by exerting an external force on the movable wall in the pivoting direction, the movable wall can be pivoted over and beyond the predetermined pivoting angle in the pivoting direction.

The storage device preferably also comprises a drive device and a drawer locking device, wherein the drive device is designed to exert a force on the drawer in order to move the drawer into the open state starting from the closed state, and the drawer locking device is designed to hold the drawer in the closed state.

Here, the storage device can also comprise a drawer unlocking device which is designed to unlock the drawer locking device in response to an actuation of the drawer unlocking device by a user.

The wall of the drawer can have a first lateral side wall portion and a second lateral side wall portion, which during the intended use extend along the vehicle longitudinal direction and are spaced apart from one another in a vehicle transverse direction, and an end wall region which during the intended use preferably extends substantially perpendicularly to the vehicle longitudinal direction and which connects the first lateral side wall portion and the second lateral side wall portion, wherein the interior of the drawer is defined or delimited by the first lateral side wall portion, the second lateral side wall portion, the end wall portion and a bottom of the drawer.

The storage device is preferably designed in such a way that, in the retracted position, the movable wall is arranged at least partially in a cavity of the end wall portion of the wall of the drawer.

Furthermore, in the retracted position, the movable wall can be arranged in a cavity of the end wall portion and a cavity of the first lateral side wall portion or of the second lateral side wall portion of the wall of the drawer. Here, in the retracted position, the movable wall can be arranged in particular completely in a cavity of the end wall portion and a cavity of the first lateral side wall portion or of the second lateral wall portion of the wall of the drawer.

According to one embodiment, a central console, in particular a cantilever central console, for a vehicle comprises an above-described storage device, wherein the housing of the storage device is formed by a housing of the central console.

A vehicle according to one embodiment comprises the above-described central console, wherein the central console extends between front seats of the vehicle along the vehicle longitudinal direction.

Preferred embodiments of the invention will be described below with reference to the drawings.

BRIEF DESCRIPTION OF THE DRAWINGS

FIG. 1 is a schematic perspective view of a central console of a vehicle having a storage device according to an embodiment of the invention.

FIG. 2 is a schematic perspective view of the central console shown in FIG. 1 in a state in which a drawer of the storage device is open, and movable walls project at least partially into an interior of the drawer.

DETAILED DESCRIPTION OF THE DRAWINGS

Figure 3:
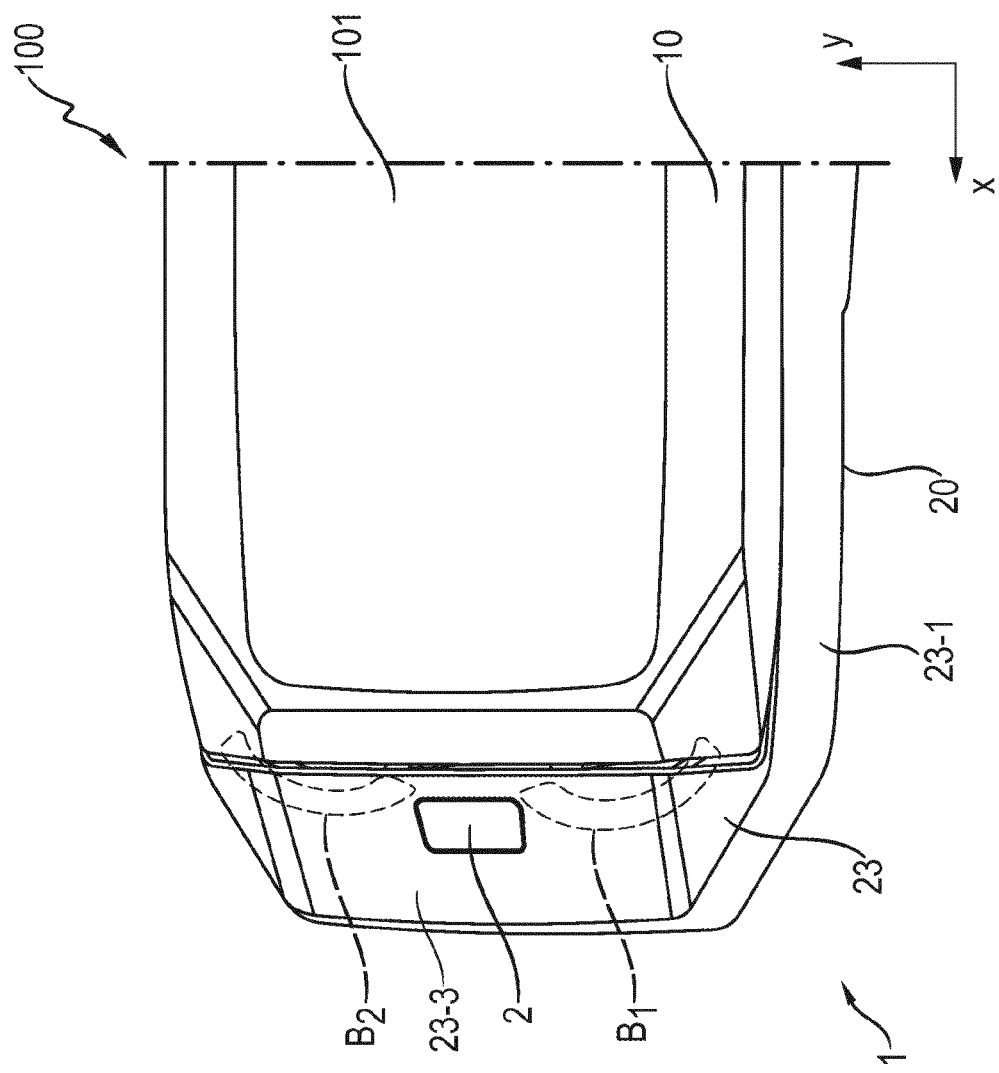
FIG. 3 is a schematic perspective view of the central console shown in FIGS. 1 and 2 in a state in which the drawer is closed.

FIG. 1 shows a schematic perspective view of a central console of a vehicle, in particular of a motor vehicle, which comprises a storage device for a vehicle. The central console 100 can for example take the form of a cantilever central console which is designed to extend between front seats (not shown) of the vehicle. The central console 100 has an operator control panel 101 with a plurality of switches or control elements (not shown) for activating electronic devices of the vehicle. Furthermore, the operator control panel 101 can also have a shift lever (not shown) and/or a handbrake handle (not shown).

The storage device 1 has a housing 10 which for example, as shown in FIG. 1, can be formed by a housing of the central console 100, and a drawer 20. During intended use, that is to say when the storage device 1 is mounted in a vehicle, the drawer 20 can, as indicated by the double arrow shown in FIG. 1, be moved relative to the housing 10 along a vehicle longitudinal direction X between a closed state and an open state. Here, the storage device 1 is particularly designed in such a way that, during the intended use, the drawer 20 is moved, to open the drawer 20, in the direction of a vehicle forward direction which corresponds to the X direction shown in FIG. 1.

In the state shown in FIG. 1, the drawer 20 is in a closed state, and is held in the closed state by a drawer locking device (not shown in FIG. 1). The storage device 1 has a key 2 or a button 2 on an upper side of an end, which is situated at the front with respect to the vehicle forward direction X, of the drawer 20 or of a region of a front side wall or end wall of the drawer 20, which key or button is connected to an unlocking device (not shown) for unlocking or releasing the drawer locking device. A user can actuate the unlocking device by pressing on the key 2 and thus unlock the drawer locking device, with the result that the drawer 20 can be moved in the direction of the vehicle forward direction X.

The storage device 1 also has a drive device (not shown) which is formed for example as a helical spring and is designed to exert a force on the drawer 20 in the direction of the vehicle forward direction X in order to move the drawer 20 for example into an open state starting from the closed state. In this way, the drawer 20, starting from the closed state in which the position of the drawer 20 is maintained by the drawer locking device, is moved automatically by the drive device in the direction of the vehicle forward direction X when pressing the key 2 to unlock the drawer locking device, and is ultimately brought into a predetermined completely opened state.

FIG. 2 illustrates the storage device 1 shown in FIG. 1 in a state in which the drawer 20 is open. The drawer 20 has a wall 23 or side wall 23, which has a first lateral side wall portion 23-1 and a second lateral side wall portion 23-2 which, during the intended use, extend along the vehicle longitudinal direction X and are spaced apart from one another in a vehicle transverse direction Y, and an end wall portion 23-3 which, during the intended use, preferably extends perpendicularly or substantially perpendicularly to the vehicle longitudinal direction X or in the direction of the vehicle transverse direction Y and which connects the first lateral side wall portion 23-1 and the second lateral side wall portion 23-2. Furthermore, the drawer 20 has a bottom 25 which, together with the first lateral side wall portion 23-1, the second lateral side wall portion 23-2, and the end wall portion 23-3, defines an interior of the drawer 20.

The interior of the drawer 20 is defined or delimited in the vehicle transverse direction Y by the first lateral side wall portion 23-1 and the second lateral side wall portion 23-2, in the vehicle forward direction X by the end wall portion 23-3, and in a vehicle vertical direction or in a downward direction by the bottom 25.

Here, during opening or closing of the drawer 20, the first lateral side wall portion 23-1, the second lateral side wall portion 23-2, the end wall portion 23-3 and the bottom 25 are moved together or in one piece relative to the housing 10 in the direction of the vehicle forward direction X or in the direction of the vehicle rearward direction −X, which is opposite to the vehicle forward direction X.

In the open state of the drawer 20, the interior of the drawer 20 is opened to the top, whereas, in the closed state, the interior of the drawer 20 is closed to the top by a part of the housing 10, such as for instance a cover on which the operator control panel 101 is mounted.

As illustrated in FIG. 2, the storage device 1 has two clamping devices with a respective movable wall 21-1, 21-2 which are each designed, during intended use in the open state of the drawer 20, by means of the respective movable wall 21-1, 21-2, to press an object (not shown), which is provided in a respective predetermined region of an interior of the drawer 20, in the direction of the wall 23 or of an inner surface 22 of the wall 23 of the drawer 20 in order to firmly clamp the object between the respective movable wall 21-1, 21-2 and the inner surface 22 of the wall 23. Here, the position of the object in the vehicle vertical direction can be held merely by the firm clamping produced by means of the movable wall 21-1, 21-2 and the inner surface 22 of the wall 23, or the object can additionally be supported by the bottom 25 of the drawer 20.

In order for example for an object in the form of a drink cup or drink bottle with a round outer circumference to be able to be firmly clamped in a suitable manner or securely between the respective movable wall 21-1, 21-2 and the respective portion or clamping portion of the inner surface 22 of the wall 23, the movable walls 21-1, 21-2 and the respective clamping portions of the inner surface 22 of the wall 23 have a curved shape adapted to the outer circumference.

Starting from the closed state of the drawer 20 as shown in FIG. 1, actuation of the key 2 causes the drawer 20 to be moved by the drive device in the direction of the vehicle forward direction X as illustrated by the arrow P1 in FIG. 2. At the same time as this movement of the drawer 20 occurs, a movement mechanism (not shown) has the effect that the movable walls 21-1, 21-2 are extended along a respective curved extension path, illustrated by the arrows P2 and P3 in FIG. 2, through a respective opening in the wall 23 into the interior of the drawer 20 from a retracted state or a parked position in which the movable walls 21-1, 21-2 are situated in a cavity of the front end of the wall 23 or of the front portion of the wall 23 or of an end side of the wall 23 or of the end wall or of the end wall portion 23-3 or in cavities of the end wall portion 23-3 and front portions, that is to say portions situated at the front in the vehicle forward direction X, of the first and second lateral side wall portion 23-1, 23-2 of the wall 23 of the drawer 20. It is possible here for in particular a radius of curvature of the movable wall 21-1, 21-2 in cross section parallel to the vehicle longitudinal direction X and the vehicle transverse direction Y to be identical to the radius of curvature of the curved extension path P2, P3 of the movable wall 21-1, 21-2.

At the end of the extension movement or at the latest on complete opening of the drawer 20, the movable walls 21-1, 21-2 pass into a predetermined first extended position or a predetermined first extended state in which a predetermined portion of the respective movable wall 21-1, 21-2 is arranged in the interior of the drawer 20, and which is fixed by means of a latching device (not shown).

In FIG. 3, the positions of the movable walls 21-1, 21-2 are illustrated, by way of dashed regions B1 and B2, in the state in which the movable walls 21-1, 21-2 are in the retracted state and in addition the drawer 20 is in the closed state, and in which the movable walls 21-1, 21-2 are situated in the cavity of the wall 23 or the cavities of the end wall portion 23-3 and of the front portions of the first and second lateral side wall portion 23-1, 23-2 of the wall 23 of the drawer 20.

Figure 4:
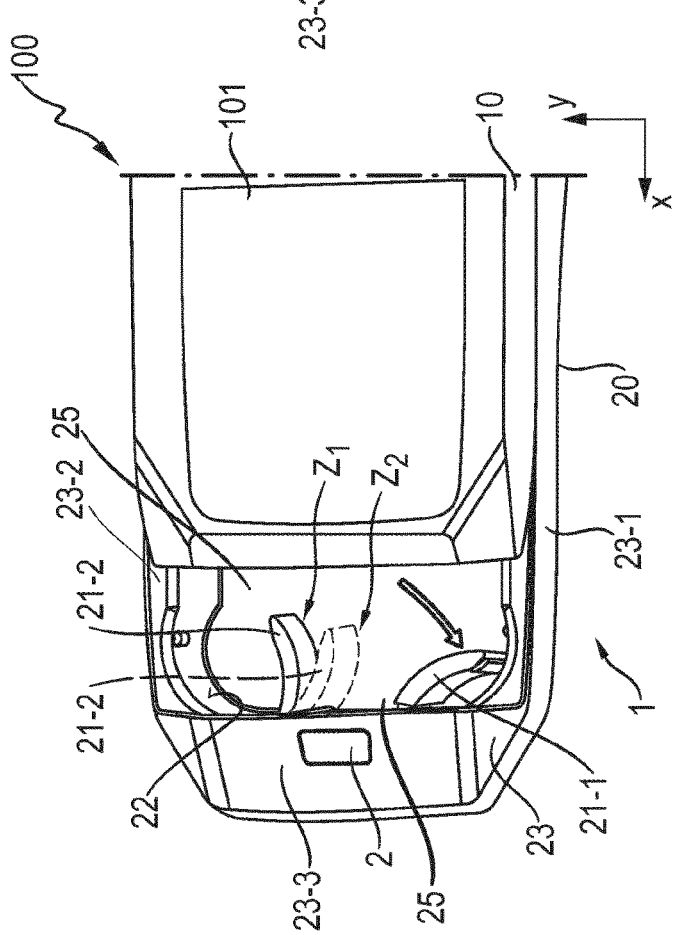
FIG. 4 is a schematic perspective view of the central console shown in FIG. 1 in a further state in which the drawer of the storage device is open.

As illustrated in FIG. 4, a clamping spring (not shown) has the effect that a force is exerted on the movable walls 21-1, 21-2 as soon as they reach the predetermined first extended state and the corresponding first extended position, which force pivots the respective movable wall 21-1, 21-2 about a respective fastening axle (not shown), on which the respective movable wall 21-1, 21-2 is pivotably fastened, in the direction of the inner surface 22 of the wall 23 in a first pivoting direction. Here, the first pivoting direction assigned to the movable wall 21-1 is opposite to the first pivoting direction assigned to the movable wall 21-2.

The pivoting angle through which the respective movable wall 21-1, 21-2 can be pivoted about the pivoting axis by means of the force exerted by the clamping spring is limited by a pivot-limiting device (not shown) in such a way that the respective movable wall 21-1, 21-2 is pivoted, without exertion of an external force on the respective movable wall 21-1, 21-2, only up to a position or first useful position, illustrated by means of the reference sign Z1, in the direction of the inner surface 22 of the side wall 23. Upon exertion of an external force on the movable wall 21-1, 21-2 in a second pivoting direction opposite to the first pivoting direction, the pivoting angle can be changed up to a second useful position, illustrated in FIG. 4 by means of the reference sign Z2.

Consequently, a size or an outer circumference of an object which can be firmly clamped by means of the movable wall 21-1, 21-2 is determined by the first useful position Z1 and the second useful position Z2.

Upon exertion of a sufficient external force on the movable wall 21-1, 21-2 in order to pivot the movable wall 21-1, 21-2 further in the direction of the first pivoting direction, for example by pressing the movable wall 21-1 illustrated in FIG. 4 in the direction of the inner surface 22, provided at the bottom in FIG. 4 of the wall 23 or of the first lateral side wall portion 23-1 of the wall 23, the movable wall 21-1 is moved in such a way that an additional portion of the movable wall 21-1 is arranged in the interior of the drawer 20, and the movable wall 21-1 is pivoted over and beyond the pivoting angle, defined by the pivot-limiting device, in the first pivoting direction. Here, the movable wall 21-1 can be pivoted for example by means of the clamping spring until the end, which is remote with respect to the fastening axle, of the movable wall 21-1 bears against the inner surface 22 of the first lateral side wall portion 23-1 of the wall 23 of the drawer 20. It is possible in this way to prevent a situation in which the movable wall 21-1, 21-2 is broken off by a user who wishes to create, in the interior of the drawer 20, space for depositing a relatively large object on the bottom 25 and presses the movable wall 21-1, 21-2 in the direction of the first pivoting direction.

Figure 5:
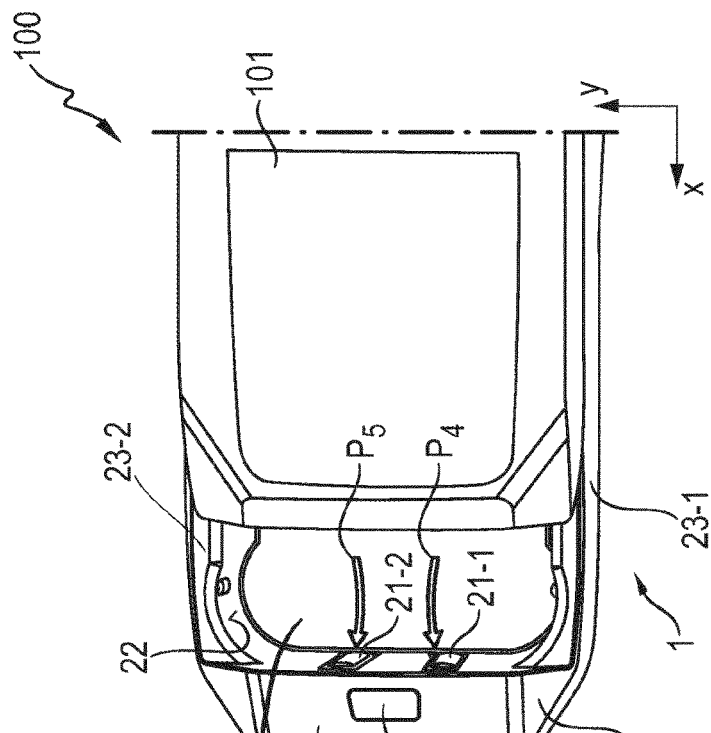
FIG. 5 is a schematic perspective view of the central console shown in FIG. 1 in a state in which the drawer of the storage device is open, and the movable walls are arranged in an end wall of the drawer.

Furthermore, in the open state of the drawer 20, as illustrated in FIG. 5, the user who does not wish to use the movable walls 21-1, 21-2 to firmly clamp an object and wishes for example to deposit the object only on the bottom 25 of the drawer 20 can push the extended movable walls 21-1, 21-2 or only one of them, by pivoting the movable wall 21-1, 21-2 in the second pivoting direction and exerting a corresponding force counter to the extension path P2, P3 or in the direction of a respective retraction path P4, P5, back again into the retracted state or the park position in which the respective movable all 21-1, 21-2 is held by means of a locking device (not shown). This locking device can be unlocked by actuating the button 2, with the result, with the drawer 20 open, that the movable walls 21-1, 21-2, starting from the retracted state, are extended again by means of the movement mechanism and are brought into the first extended state.

Figure 6:
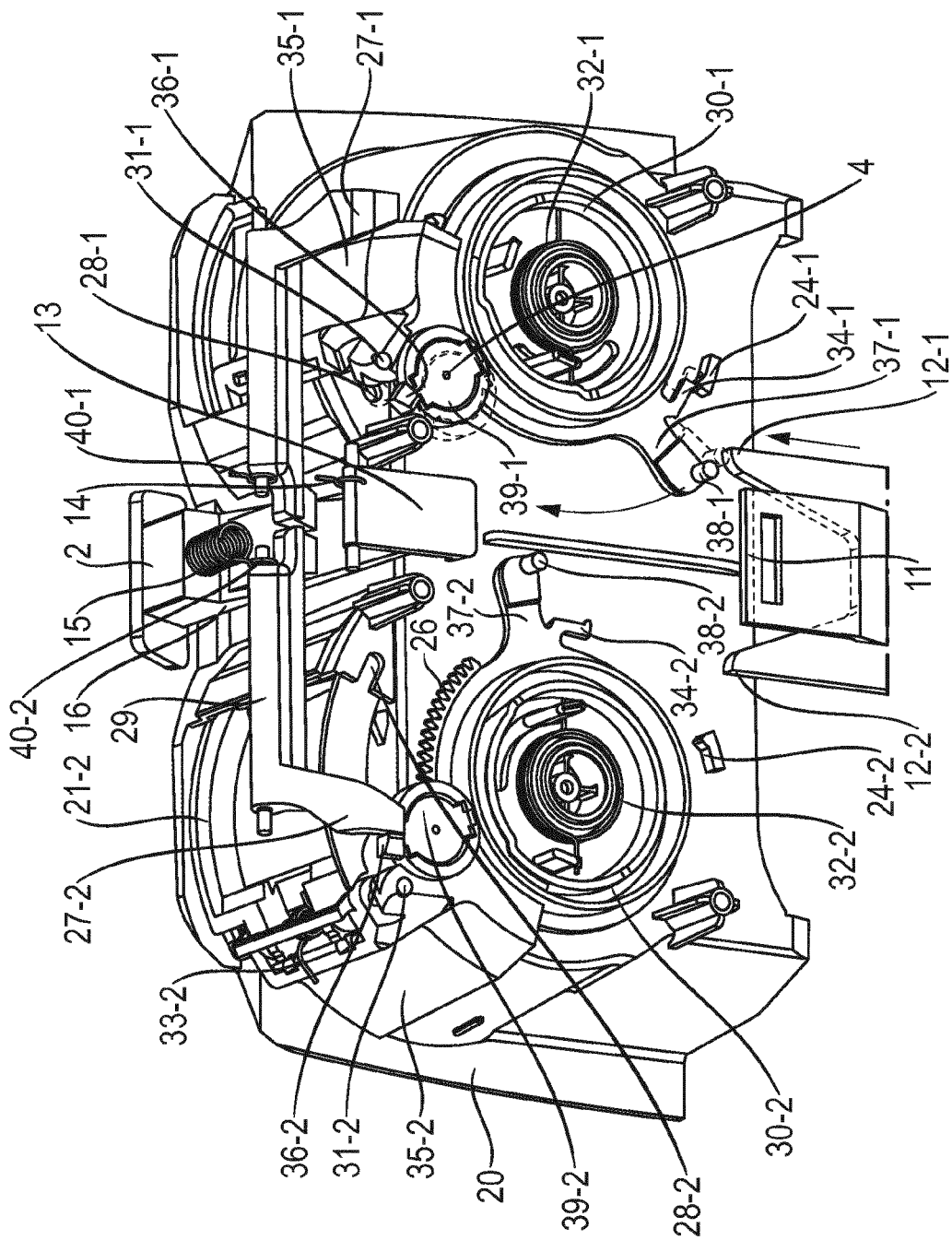
FIG. 6 is a schematic perspective view from below of the drawer of the storage device.

With reference to FIG. 6, the above-described movement, locking and unlocking mechanisms of the storage device 1 will be explained in more detail below. FIG. 6 shows a perspective schematic view obliquely from below of the drawer 20, with its outer wall or outer portions of the wall 23 and of the bottom 25 not being illustrated, together with a drawer latching-in contour 11 of the drawer locking device that is fastened to the housing 10 (not shown in FIG. 6), and a rotary disk retraction contour 12-1, 12-2, which is fastened to the housing 10, in an open state of the drawer 20.

The above-described drawer locking device has the drawer latching-in contour 11, which is fastened to the housing 10, and a drawer latching-in element 13, which is fastened to the drawer 20. Here, as shown in FIG. 6, the drawer latching-in element 13 can be formed for example as a latching-in hook which is pivotably mounted. In the locked state of the drawer 20, the latching-in hook is hooked into an opening of the drawer latching-in contour 11 and is held in the hooked-in state by means of a tension spring 14. The key 2, which is brought into its starting position again by means of a resetting spring 15 after completed pressing of the key 2, is coupled to an unlocking element 16 which is designed, upon pressing the key 2, to pivot the latching-in hook in a direction counter to the action of force of the tension spring 14. This pivoting movement causes the latching-in hook to be hooked out of the opening of the drawer latching-in contour 11, with the result that the drawer locking device is released, the drawer 20 is opened by the drive device (not shown), and at the same time the movable walls 21-1, 21-2 are extended by means of the movement mechanism.

With reference to the movement mechanism, two rotary disks 30-1, 30-2, which are mounted so as to be rotatable about a respective axis of rotation, are mounted on a bottom side or underside of the bottom 25 of the drawer 20 or in an interspace of the drawer 20 between the interior of the drawer 20 and the underside of the drawer 20 or in the bottom 25 of the drawer 20. Here, the axes of rotation of the rotary disks 30-1, 30-2 preferably extend perpendicularly to a bottom surface of the bottom side or of the bottom 25 of the drawer 20 and, during intended use, parallel to the vehicle vertical direction. On each of the rotary disks 30-1, 30-2 or on an outer portion thereof with respect to the respective axis of rotation there is provided a connecting element 35-1, 35-2 on which there is mounted a fastening axle 31-1, 31-2 which extends parallel to and at a distance from the axis of rotation of the respective rotary disk 30-1, 30-2.

The movable walls 21-1, 21-2, of which in FIG. 6 only the movable wall 21-2 shown in FIGS. 2 and 4 is visible, or a fastening portion thereof has a through-hole through which the corresponding fastening axle 31-1, 31-2 runs. As illustrated in FIG. 6, the fastening portion of the movable wall 21-1, 21-2 is preferably provided at one end of the movable wall 21-1, 21-2.

The movable wall 21-1, 21-2 is mounted by means of the fastening axle 31-1, 31-2 in such a way that it can pivot about the fastening axle 31-1, 31-2 and at the same time the movable wall 21-1, 21-2 is pressed in the direction of the first pivoting direction by means of a clamping spring, of which in FIG. 6 only the clamping spring 33-2 is shown. However, in the retracted state, and during the extension of the movable walls 21-1, 21-2, this pivoting movement is prevented by a guide device which for example can comprise the portions of the wall 23 which define the openings of the wall 23. Moreover, given that the movable wall 21-1, 21-2 is connected to the rotary disk 30-1, 30-2 via the connecting element 35-1, 35-2, a position of the movable wall 21-1, 21-2 is changed during a rotation of the rotary disk 30-1, 30-2. Here, particularly during the rotation of the rotary disk 30-1, 30-2, at least the fastening portion of the movable wall 21-1, 21-2 is moved over a circular path. Furthermore, with a corresponding design of the guide device, it is also possible for the entire movable wall 21-1, 21-2 to be moved over a circular path during the rotation of the rotary disk 30-1, 30-2 until the first extended state is reached.

In order to transfer the movable walls 21-1, 21-2 into the extended state starting from the retracted state illustrated on the left-hand side of FIG. 6, there is provided a respective torsion spring 32-1, 32-2 which is designed in such a way that it exerts a force on the corresponding rotary disk 30-1, 30-2 in order to rotate it in the first direction of rotation or extension direction of rotation.

In order to damp the rotary movement of the respective rotary disk 30-1, 30-2 there is provided a respective damping device which has a respective rack, which is mounted on the drawer 20 and of which only the rack 26 is visible in FIG. 6, and a respective rotatably mounted toothed wheel 39-1, 39-2, which is mounted on the connecting element 35-1, 35-2 and which engages in the respective rack 26. Here, a rotary movement of the toothed wheel 39-1, 39-2 is damped by means of a braking device which for example can comprise silicone and exerts a frictional force on the toothed wheel 39-1, 39-2 in order to slow down the rotary movement.

The devices for fixing the positions of the rotary disk 30-1, 30-2 in the first and the second extended state of the movable walls 21-1, 21-2 are explained below on the basis of the rotary disk 30-1 which is illustrated on the right-hand side of FIG. 6. Each of the rotary disks 30-1, 30-2 has a latching element 34-1, 34-2 which serves for fixing the first extended state of the movable wall 21-1, 21-2. As illustrated in FIG. 6, in the first extended state, the latching element 34-1 butts against a latching contour 24-1 provided on the drawer 20. Here, the spring force of the respective torsion spring 32-1, 32-2 is set in such a way that, as a result of the spring force, the rotary disk 30-1, 30-2 cannot be rotated further in the respective first direction of rotation than up to the position in which the latching element 34-1, 34-2 butts against the latching contour 24-1, 24-2.

Here, as illustrated in FIG. 6, each of the rotary disks 30-1, 30-2 can have a radially outwardly projecting portion 37-1, 37-2, wherein the respective latching element 34-1, 34-2 is provided at a free end of a resilient arm which extends starting from the projecting portion 37-1, 37-2. Upon exerting on the rotary disk 30-1 a predetermined force in the first direction of rotation in the first extended state of a movable wall 21-1, 21-2, for example by pulling on the movable wall 21-1 along the first direction of rotation, the resilient arm is bent in such a way that the latching element 34-1 slides over the latching contour 24-1 and thus the rotary disk 30-1 is rotated further in the direction of the first direction of rotation. On account of the spring force of the torsion spring 32-1, the rotary disk 30-1 is rotated further in the first direction of rotation until the second extended state is reached in which a further rotary movement of the rotary disk 30-1 in the first direction of rotation is prevented. This prevention of the further rotary movement of the rotary disk 30-1, 30-2 can be achieved for example by means of an end stop 28-1, 28-2 which is illustrated in FIG. 6 and which is provided on the drawer 20 and against which there bears the connecting element 35-1, 35-2 and/or the fastening axle 31-1, 31-2 upon reaching the second extended state.

As has been described above with reference to FIG. 5 it is possible, with the drawer 20 open, for one of the movable walls 21-1, 21-2 or both, by exerting an external force on the corresponding movable wall 21-1, 21-2, to be pushed back into the retracted state starting from the first or second extended state, in which retracted state said wall is held by means of a locking device. This locking device has a locking projection 36-1, 36-2, which is provided on the connecting element 35-1, 35-2, and a locking lever 27-1, 27-2 which is pivotably mounted by means of a locking lever pivoting axle 29 mounted on the drawer 20 and which is held in a locking position by means of a resetting spring 40-1, 40-2.

The locking projection 36-1, 36-2 and the locking lever 27-1, 27-2 are designed in such a way that, during a rotation of the rotary disk 30-1, 30-2 starting from the extended state of the movable walls 21-1, 21-2 in a second direction of rotation or retraction direction which is opposite to the first direction of rotation, a wedge-shaped portion of the locking projection 36-1, 36-2 slides along the locking lever 27-1, 27-2 and pivots the locking lever 27-1, 27-2 against the spring force of the resetting spring 40-1, 40-2 from the locking position into an unlocking position. After the locking projection 36-1, 36-2 has slid along the second direction of rotation past the locking lever 27-1, 27-2 and the movable walls 21-1, 21-2 are in the retracted state, the locking lever 27-1, 27-2 is pivoted again into the locking position by the resetting force of the resetting spring 40-1, 40-2, whereby the movement of the rotary disk 30-1, 30-2 in the first direction of rotation is prevented as a result of contact between the locking projection 36-1, 36-2 and the locking lever 27-1, 27-2.

The unlocking element 16, which is coupled to the key 2, is also coupled to the locking lever pivoting axle 29 in such a way that, when the key 2 is pressed, the locking lever 27-1, 27-2 is pivoted into the unlocking position. In this way it is possible, in a state in which the drawer 20 is open and the movable walls 21-1, 21-2 are retracted, to cause the movable walls 21-1, 21-2 to be extended again by pressing on the key 2.

If the drawer 20 in the open state is closed by exerting an external force, the movable walls 21-1, 21-2, if they are in an arbitrary extended state, for example in the first or second extended state, are brought into the retracted state by means of a retraction mechanism. The retraction mechanism has a retraction projection 38-1, 38-2, which is arranged on the outwardly projecting portion 37-1, 37-2, and the rotary disk retraction contour 12-1, 12-2 which is fastened to the housing 10, said projection and contour being designed in such a way that, during closing of the drawer 20, the retraction projection 38-1, 38-2 comes into contact with the rotary disk retraction contour 12-1, 12-2 and remains in contact therewith during the subsequent further closing movement of the drawer 20, and the rotary disk 30-1, 30-2 is thus caused to rotate in the second direction of rotation. In this way, the movable walls 21-1, 21-2 are retracted in such a way that, in the closed state of the drawer 20, they are in the retracted state in which they are held by means of the locking device.

In one embodiment (not shown), the movable walls 21-1, 21-2 can also be rigidly connected to the corresponding connecting element 35-1, 35-2. In this case, the clamping device has, instead of the clamping spring 33-2, an elastically preloaded clamping element.

According to one embodiment, the elastically preloaded clamping element can be mounted on the wall 23 of the drawer 20, for example on the inner surface 22 of the wall 23, and be designed to press the object in the direction of the movable wall 21-1, 21-2 situated in the first extended position.

According to another embodiment, the elastically preloaded clamping element can also be mounted on the movable wall 21-1, 21-2 and be designed, in the first extended state, to press the object in the direction of the wall 23 or the inner surface 22 of the wall 23.

A respective clamping element is preferably mounted both on the movable wall 21-1, 21-2 and on the wall 23 of the drawer 20.

What is claimed is:

1. A storage device for a vehicle, comprising:
   a housing;
   a drawer, which during intended use is movable relative to the housing along a vehicle longitudinal direction between a closed state and an open state;
   a movable wall configured to clamp an object between the movable wall and a wall of the drawer; and
   a movement mechanism that automatically moves the movable wall from a retracted position to a first extended position, in response to the drawer transitioning from the closed state to the open state, such that:
   while the drawer is in the closed state, the movable wall is in the retracted position, whereby the movable wall is arranged in a cavity of the wall, and such that: when the drawer transitions to the open state, the movable wall moves substantially counter to the drawer to the first extended position, whereby the movable wall is arranged at least partially in an interior of the drawer,
wherein the movement mechanism has a rotary disk and a torsion spring,
wherein the rotary disk is rotatable about an axis of rotation and mounted on the drawer, and
wherein the movable wall is coupled to the rotary disk in such a way that the movable wall is moved during a rotation of the rotary disk and the torsion spring exerts a force on the rotary disk in order to rotate the rotary disk about the axis of rotation in a first direction of rotation, and thus to move the movable wall from the retracted position at least into the first extended position.

2. The storage device according to claim 1, wherein
the movable wall has a curved shape in cross section perpendicular to the axis of rotation, and
the movement mechanism moves the movable wall from the retracted position into the first extended position along a circular path whose radius corresponds to a radius of curvature of the movable wall.

3. The storage device according to claim 1, further comprising:
a retraction mechanism that, during a movement of the drawer along a closing direction, rotates the rotary disk about the axis of rotation in a second direction of rotation opposite the first direction of rotation in such a way that the movable wall is brought to the retracted position in the closed state.

4. The storage device according to claim 3, wherein the retraction mechanism includes:
a rotary disk retraction contour fastened to the housing; and
a retraction projection connected to the rotary disk, wherein the rotary disk retraction contour and the retraction projection are configured such that, during the movement of the drawer along the closing direction, the rotary disk is rotated in the second direction of rotation via the retraction projection coming into contact with the rotary disk retraction contour and remaining in contact therewith during subsequent further movement of the drawer along the closing direction.

5. The storage device according to claim 1, further comprising:
a rotary disk locking device that holds the rotary disk in a position according to which the movable wall is in the retracted position.

6. The storage device according to claim 5, further comprising:
a rotary disk unlocking device that unlocks the rotary disk locking device in response to an actuation of the rotary disk unlocking device.

7. The storage device according to claim 1, further comprising:
a damping device that dampens a rotary movement of the rotary disk.

8. The storage device according to 1, wherein
a latching element is provided on the rotary disk,
a latching contour is provided on the drawer, and
the latching element and the latching contour are configured such that, in the first extended position of the movable wall, the latching element bears against the latching contour in order to prevent a further movement of the rotary disk in the first direction of rotation.

9. The storage device according to claim 8, wherein the latching element and the latching contour are configured such that, upon exertion of an external force, whose magnitude is greater than a predetermined value, on the movable wall in the first direction of rotation, the rotary disk is moved further in the first direction of rotation, and the latching element slides over the latching contour.

10. The storage device according to claim 9, further comprising:
an end stop which is mounted on the drawer and by which a second extended position of the movable wall is defined, wherein the end stop prevents a further rotary movement of the rotary disk in the first direction of rotation after the latching element has slid over the latching contour.

11. The storage device according to claim 1, wherein
the movement mechanism has a fastening axle which is coupled to the rotary disk, and
the movable wall is mounted on the fastening axle in such a way that the movable wall is pivotable about the fastening axle.

12. The storage device according to claim 11, wherein the fastening axle extends parallel to the axis of rotation.

13. The storage device according to claim 11, wherein a pivoting movement, caused by a clamping spring, of the movable wall in a pivoting direction is limited to a predetermined pivoting angle, and
wherein by exerting an external force on the movable wall in the pivoting direction, the movable wall is pivotable over and beyond the predetermined pivoting angle in the pivoting direction.

14. The storage device according to claim 1, further comprising:
a drawer locking device, wherein the drawer locking device that holds the drawer in the closed state so as to prevent a storage device provided driving force exerted on the drawer from moving the drawer into the open state from the closed state.

15. The storage device according to claim 14, further comprising:
a drawer unlocking device that unlocks the drawer locking device in response to an actuation of the drawer unlocking device.

16. The storage device according to claim 1, wherein
the wall of the drawer has a first lateral side wall portion and a second lateral side wall portion, which during intended use extend along the vehicle longitudinal direction, and an end wall portion which connects the first lateral side wall portion and the second lateral side wall portion, and
the interior of the drawer is delimited by the first lateral side wall portion, the second lateral side wall portion, the end wall portion and a bottom of the drawer.

17. The storage device according to claim 16, wherein in the retracted position, the movable wall is arranged at least partially in a cavity of the end wall portion of the wall of the drawer.

18. The storage device according to claim 16, wherein in the retracted position, the movable wall is arranged in: (a) a cavity of the end wall portion, and (b) a cavity of the first lateral side wall portion or of the second lateral side wall portion.

19. A central console for a vehicle, comprising:
a storage device according to claim 1, wherein the housing of the storage device is formed by a housing of the central console.

\* \* \* \* \*